(12) United States Patent  (10) Patent No.: US 9,090,039 B2
Smyly  (45) Date of Patent: Jul. 28, 2015

(54) PAPER TUBE FOR WINDING MATERIALS

(71) Applicant: Kline Smyly, Ruffin, SC (US)

(72) Inventor: Kline Smyly, Ruffin, SC (US)

( * ) Notice: Subject to any disclaimer, the term of this patent is extended or adjusted under 35 U.S.C. 154(b) by 2 days.

(21) Appl. No.: 14/096,076

(22) Filed: Dec. 4, 2013

(65) Prior Publication Data

US 2014/0319202 A1   Oct. 30, 2014

Related U.S. Application Data

(60) Provisional application No. 61/815,615, filed on Apr. 24, 2013.

(51) Int. Cl.
*B31C 3/00* (2006.01)
*B29C 65/60* (2006.01)

(52) U.S. Cl.
CPC .. *B31C 3/00* (2013.01); *B29C 65/60* (2013.01)

(58) Field of Classification Search
USPC ............... 229/93; 162/362, 118; 242/610.1; 138/150; 428/37
See application file for complete search history.

(56) References Cited

U.S. PATENT DOCUMENTS

| | | | |
|---|---|---|---|
| 647,334 A | 4/1900 | Shuman | |
| 652,868 A | 7/1900 | White | |
| 1,319,455 A | 10/1919 | Bartlett | |
| 1,442,955 A | 1/1923 | Lane | |
| 2,532,494 A | 12/1950 | Hensler | |
| 2,888,043 A | 5/1959 | Reid | |
| 3,289,973 A | 12/1966 | Spencer | |
| 3,430,543 A | 3/1969 | McCleery | |
| 3,813,026 A * | 5/1974 | Biancamaria | 229/4.5 |
| 3,926,657 A | 12/1975 | McConnell | |
| 4,039,706 A * | 8/1977 | Tajima et al. | 428/40.3 |
| 4,462,556 A | 7/1984 | Graham, Jr. | |
| 4,792,326 A * | 12/1988 | Tews | 604/11 |
| 4,954,383 A * | 9/1990 | King et al. | 428/131 |
| 5,316,622 A | 5/1994 | Babinsky et al. | |
| 5,374,468 A | 12/1994 | Babinsky et al. | |
| 5,505,395 A | 4/1996 | Qiu et al. | |
| 6,186,936 B1 | 2/2001 | Smith et al. | |
| 6,815,022 B2 | 11/2004 | Renck et al. | |
| 8,012,309 B2 | 9/2011 | Pare et al. | |
| 8,257,534 B2 | 9/2012 | Sekar et al. | |
| 2004/0052986 A1 | 3/2004 | Bank | |
| 2004/0076798 A1 | 4/2004 | Larsson et al. | |
| 2004/0096604 A1 | 5/2004 | Van de Camp | |
| 2006/0278357 A1 | 12/2006 | Suzuki et al. | |

* cited by examiner

*Primary Examiner* — Christopher Demeree
(74) *Attorney, Agent, or Firm* — Joseph T. Guy; Perkins Law Firm, LLC

(57) ABSTRACT

An improved paper tube is described. The paper tube has a core with an adhesive on the core. A pierced protrusion layer comprising pierced protrusions is wound on the core and adhered to the core by the adhesive wherein the adhesive at least partially fills the pierced protrusions. A surface adhesive is on the pierced protrusion layer.

20 Claims, 4 Drawing Sheets

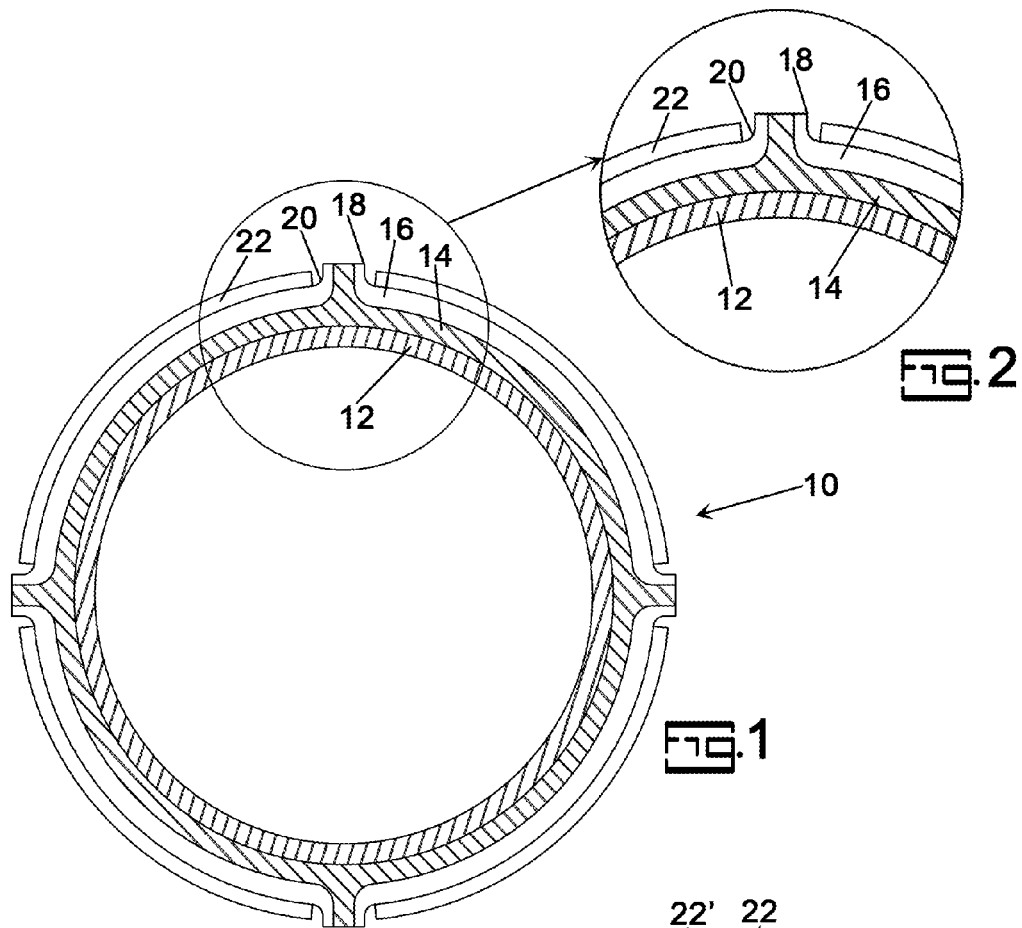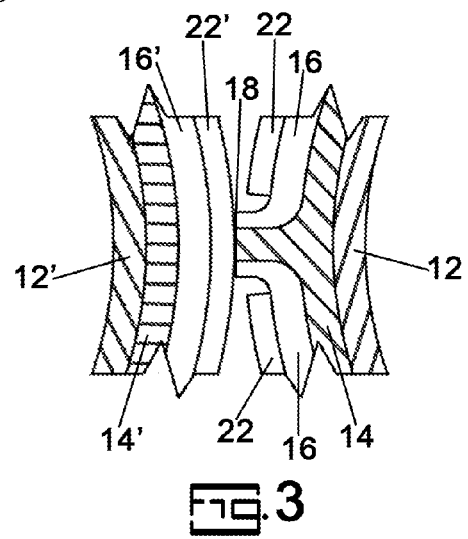

PAPER TUBE FOR WINDING MATERIALS

CROSS-REFERENCE TO RELATED APPLICATIONS

The present invention claims priority to pending U.S. Provisional Patent Application No. 61/815,615 filed Apr. 24, 2013 which is incorporated herein by reference.

BACKGROUND

The present invention is related to an improved paper tube as typically used for transport, storage and feeding of wound sheet stock such as, without limit thereto, fabrics. More specifically, the present invention is related to an improved paper tube which has pierced protrusions and surface adhesive wherein the paper tube can be stored in a stacked parallel arrangement without the necessity of protective winding.

Paper tubes, or mandrels, have been used for some time in the material handling industry, particularly, as a base for elongated sheets, fibers and the like. Though not limited thereto, as sheets or fibers are made they are typically wound onto a paper tube for subsequent transport and for loading into a subsequent process wherein the sheets or fibers are unwound and incorporated into a product of some type. The paper tube is therefore not necessarily incorporated into a product but is a tool used in the storage and transport of goods which are converted to product. The paper tube may be re-used, however, it is far more common to use the paper tubes once and then discard them. Therefore, it is highly desirable that the cost of the paper tube be maintained at as low a level as possible.

Starting the process of wrapping goods on the paper tube is a matter of some concern. The wrapped goods must be sufficiently secure to allow the tube to turn, thereby wrapping more layers, without the leading edge of the goods sliding on the tube. One way this is done is to apply a surface adhesive, preferably a contact or pressure sensitive adhesive, on the surface of the paper tube. While this is sufficient for securing the leading edge it causes significant handling problems with the tubes prior to loading and use. The tubes must be isolated from each other to avoid adjacent tubes from becoming adhered to each other. Typically, adhesive coated paper tubes have a release paper applied thereto which provides a barrier between adjacent tubes for shipping and storage purposes. Unfortunately, the release paper must be removed and discarded which adds to the manufacturing complexity and cost of the paper tubes neither of which is desirable.

Provided herein is an improved paper tube which allows for the use of a pressure sensitive adhesive yet does not require a release paper.

SUMMARY

It is an object of the invention to provide an improved paper tube which allows for the use of surface adhesive, particularly contact or pressure sensitive adhesive, without the necessity of a release paper overlay.

A particular feature of the invention is the improved adhesion between the improved paper tube and the material being wrapped thereon.

These and other advantages, as will be realized, are provided in an improved paper tube. The paper tube has a core with an adhesive on the core. A pierced protrusion layer comprising pierced protrusions is wound on the core and adhered to the core by the adhesive wherein the adhesive at least partially fills the pierced protrusions. A surface adhesive is on the pierced protrusion layer.

Yet another embodiment is provided in a method for forming an improved paper tube. The method includes:
providing a core;
adhering a pierced protrusion layer to the core as a winding with an adhesive wherein the pierced protrusion layer comprises pierced protrusions and the adhesive at least partially fills the pierced protrusions; and
applying a surface adhesive to the pierced protrusion layer.

BRIEF DESCRIPTION OF DRAWINGS

FIG. 1 is a schematic cross-sectional view of an embodiment of the invention.

FIG. 2 is a schematic partial cross-sectional view of an embodiment of the invention.

FIG. 3 is a schematic cross-sectional view illustrating an advantage of the invention.

DESCRIPTION

Figure 4:
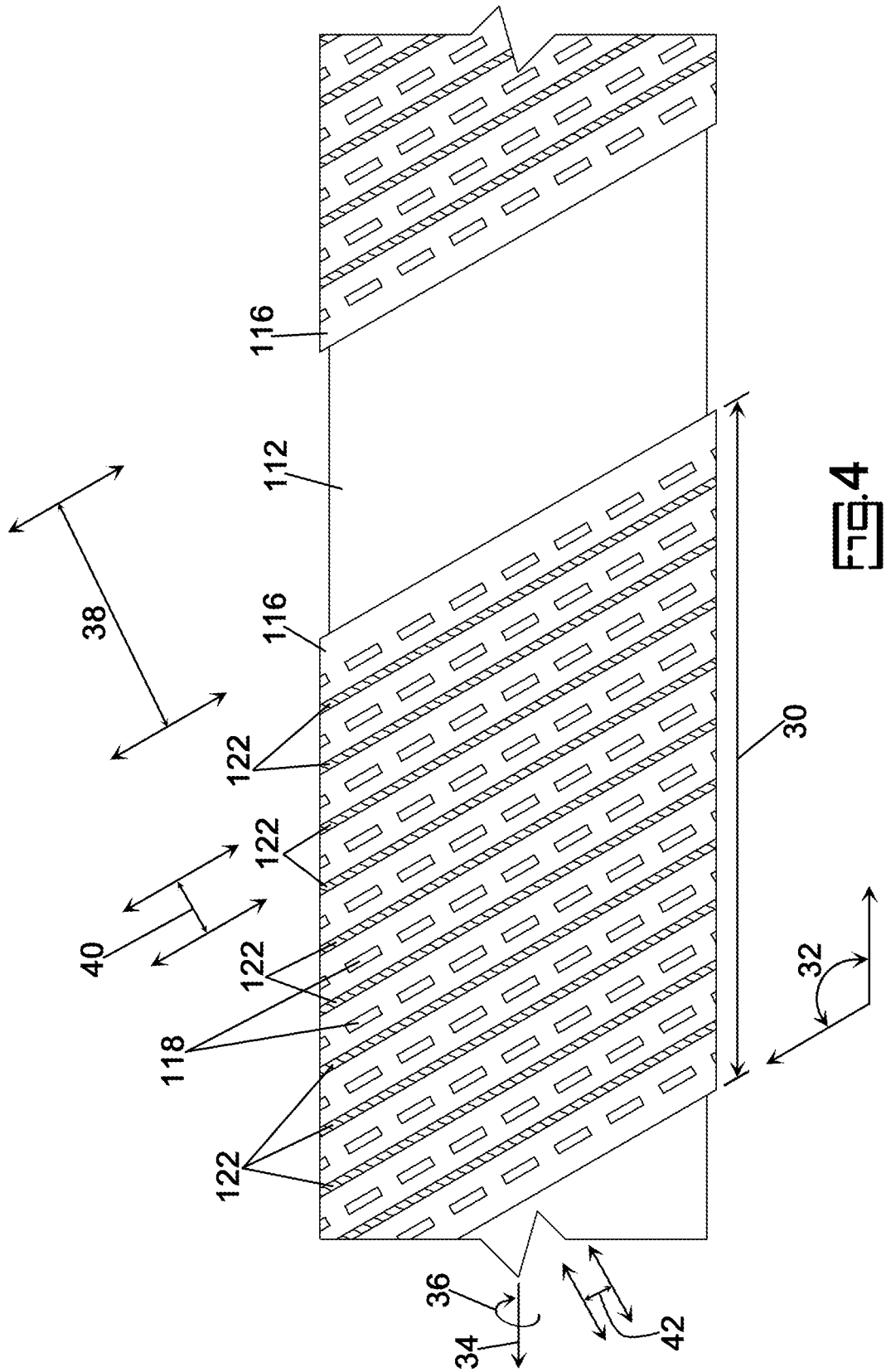
FIG. 4 is a schematic side view of an embodiment of the invention.

The present invention is directed to an improved paper tube for winding goods thereon. More specifically, the present invention is related to an improved paper tube with perforated protrusions wherein the perforated protrusions improve adhesion with goods wrapped on the paper tube and provides a spacer between adjacent tubes thereby minimizing adhesion between adjacent tubes and eliminating the necessity for release paper.

The invention will be described with reference to the figures forming an integral, non-limiting, component of the disclosure. The figures are intended to facilitate an understanding of the invention and are not intended to limit the invention in any way. Throughout the figures similar elements will be numbered accordingly.

An embodiment of the invention will be described with reference to FIG. 1. In FIG. 1 an improved paper tube, 10, is illustrated in schematic cross-sectional view. A partial view of the paper tube is illustrated in FIG. 2. The paper tube, 10, comprises a hollow core, 12, illustrated as a convoluted tube. Though a solid core could be used it is not desirable for most applications due to the wasted material required to form a solid core and the fact that most equipment utilizes a protrusion which extends into the hollow core for unwinding the material wrapped on the paper tube. The core is illustrated as a single layer with the understanding that the core is typically a build-up of multiple layers of the same material, or of different materials, depending on the strength and weight requirements of the paper tube. Subsequent layers of the core are adhered to each other by a glue or adhesive which as well known in the art and which is not necessarily limited herein.

An adhesive layer, 14, is between the core and a pierced protrusion layer, 16. The adhesive is not particularly limited herein and can be standard glues or adhesives used in the art of making paper tubes. The pierced protrusion layer, 16, comprises a multiplicity of pierced protrusions, 18, which are a breach through the surface, 20. As would be realized the adhesive layer fills at least a portion and preferably a majority of the pierced protrusion and may express through the pierced protrusion. Surface adhesive, 22, which is preferably a contact or pressure sensitive adhesive is on the surface of the material between the pierced protrusions preferably at a thickness which is less than the height of the protrusion above the exterior surface of the surface material.

An advantage of the invention can be realized by reference to FIG. 3. In FIG. 3 adjacent paper tubes are illustrated in partial cross-sectional view. Each paper tube has a core, 12 and 12', an adhesive layer, 14 and 14', and a pierced protrusion layer, 16 and 16', with a surface adhesive, 22 and 22', on the surface. The pierced protrusion, 18, forms a spacer between adjacent paper tubes thereby prohibiting adjacent tubes from coming into close enough proximity for the pressure sensitive adhesives to adhere one to the other. The adhesive layer, 14, which expresses into the pierced protrusion provides sufficient structural integrity to insure that the pierced protrusion is not crushed to the degree necessary to eliminate the function thereof. By minimizing the contact with the surface adhesive the adjacent paper tubes do not adhere strongly and are therefore easily separated for use.

An embodiment of the invention will be described with reference to FIG. 4. In FIG. 4, a pierced protrusion layer, 116, is illustrated on a core, 112. As would be realized the pierced protrusion layer is typically a continuous sheet with a width, 30, applied to the core at a pitch, 32, which is the angle of the continuous sheet relative to the rotational axis of the core. The width of the continuous sheet is not particularly limited herein and is typically chosen to be compliant with the equipment used to manufacture the paper tube. As would be realized the tube can rotate around an axis thereby drawing and wrapping the pierced protrusion layer thereon while the core advances as illustrated at 34 and 36 or the core can be rotationally stationary while the pierced protrusion layer wraps around the core, counter to arrow 36, as either the core advances in the direction of arrow 34 or the mechanism wrapping the pierced protrusion advances opposite to arrow 34. Regardless of the mechanism for wrapping there is relative rotation of the core with respect to the pierced protrusion layer and relative advancing of the core with respect to the point of contact of the pierced protrusion layer and core. For manufacturing simplicity it is preferable that the core rotate and advance while rotationally drawing pierced protrusion layer from a mandrel, or similar supply, preferably through some type of accumulator and coaters as will be more fully described herein. The combination of pitch and rate of relative core advancement defines the separation distance, 38, between adjacent wraps. Adjacent wraps may overlap, defined herein as a negative separation, be touching, defined herein as a zero separation, or be separated by some distance, referred to herein as a positive separation. For most applications a zero separation or small separation is preferable thereby maximizing surface area of the pierced protrusion layer. It is preferable for some embodiments that the separation between adjacent wraps, 38, be no more than the width, 30. In practice a small positive separation is planned wherein the positive separation is approximately equal to the tolerance of the machine therein insuring very few incidences of negative overlap with the typical average overlap being no less than zero and no more than the machine tolerance.

With continued reference to FIG. 4, the pierced protrusions, represented as rectangles for ease of illustration, are generally in rows, with a lateral separation, 40, defined as perpendicular to the long axis of the pierced protrusion layer, and a frequency separation, 42, measured parallel to the long axis of the pierced protrusion layer. Each row of pierced protrusions may have a unique frequency separation or a random frequency separation, however, for manufacturing simplicity it is highly preferable that each row of pierced protrusions be formed by a piercing wheel which rotates on an axis perpendicular to the relative to the direction of the movement of the pierced protrusion layer thereby imparting a periodic placement of pierced prostrusions the periodicity of which is a design choice. In FIG. 4 the surface adhesive, 122, is a coating between adjacent rows of pierced protrusions. It is preferable that the pierced protrusions be in rows since this allows the surface adhesive to be applied as a coating between the rows of pierced protrusions in one embodiment.

Figure 5:
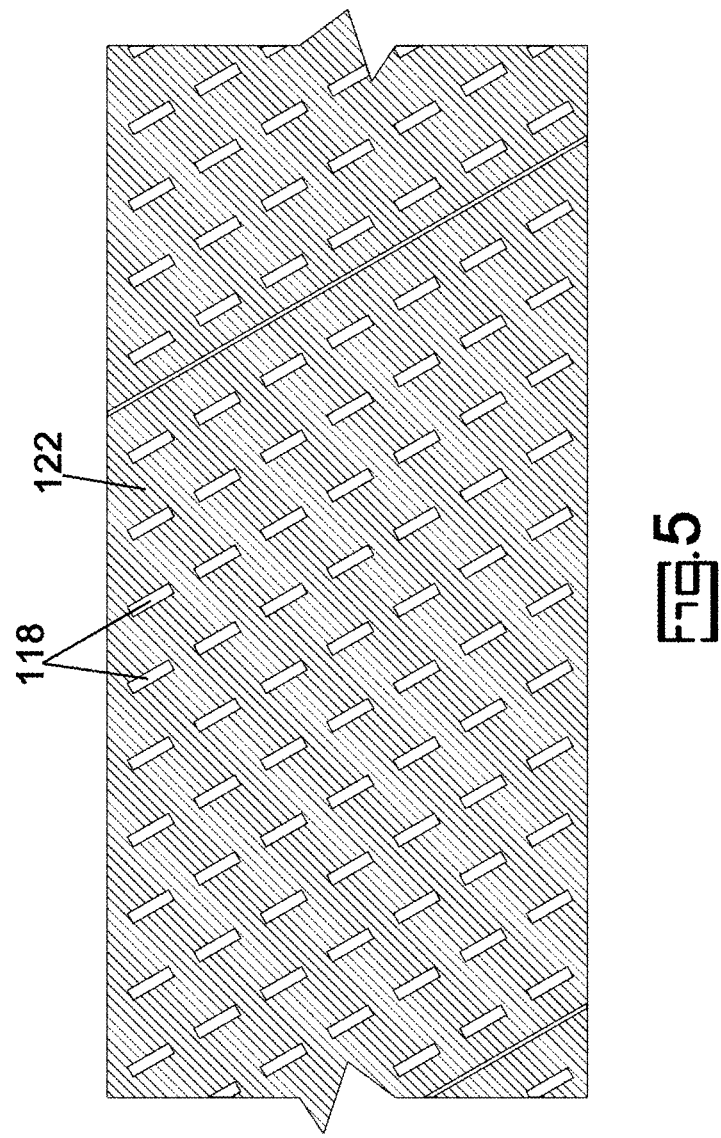
FIG. 5 is a schematic side view of an embodiment of the invention.

An embodiment of the invention is illustrated in partial side view in FIG. 5. In FIG. 5 the separation between adjacent wraps is about zero. In FIG. 5, the surface adhesive, 122, covers the surface of the pierced protrusion layer.

Figure 6:
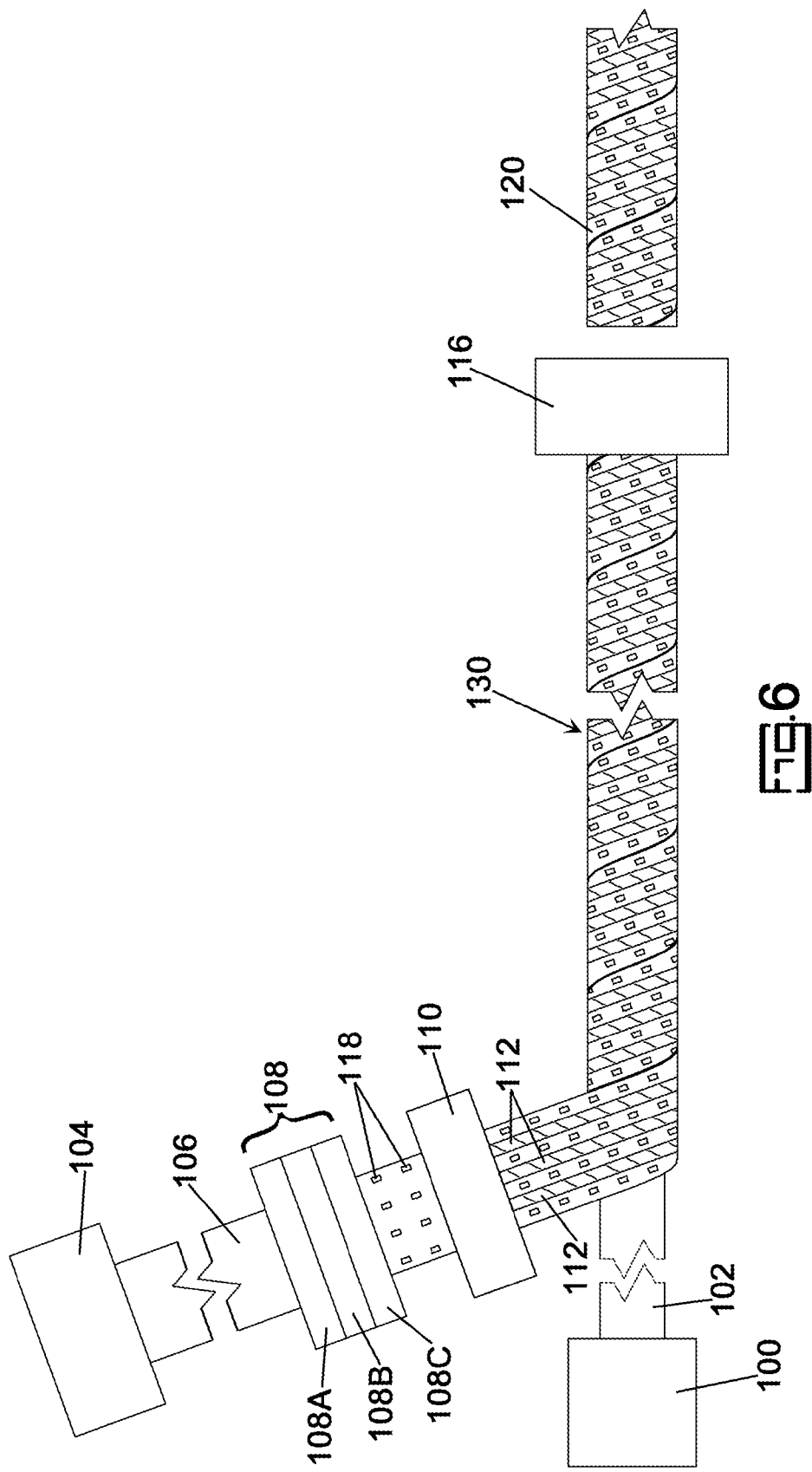
FIG. 6 is a schematic representation of an embodiment of the invention.

An embodiment of the invention will be described with reference to FIG. 6 wherein the method of manufacturing of the paper tube will be described. In FIG. 6, a core formation process, 100, forms a core, 102, preferably of laminated material illustrated as a spiral tube, preferably cellulosic material such as paper, upon which the pierced protrusion layer will be applied. A supply mechanism, 104, which may include an accumulator, supplies precursor layer, 106, which is drawn therefrom. The precursor layer passes through a conversion zone, 108, comprising a piercing station an adhesive coating station and an optional turning station, 108A 108B and 108C in no particular order. The piercing station may be before the adhesive coating station or after the adhesive coating station and they may be a simultaneous operation. The piercing station perforates the precursor layer thereby providing pierced protrusions, 118, projecting from one surface, which will ultimately be the outer surface, and the adhesive coating station applies an adhesive on the opposite side thereof which will ultimately be the inner surface thereby forming a pierced protrusion layer. Depending on the method of coating a turning station may be preferable to rotate the pierced protrusion layer prior to subsequent operation. Some coating techniques apply the adhesive on the upper surface of a passing layer and some coating techniques apply the adhesive on the bottom surface of a passing layer. If necessary, the turning station can reorient the layer either by partially circumnavigating a roller, which maintains planarity, or by twist techniques both of which are well known in the art and will not be described further herein. The order of piercing station, adhesive station and turning station is not particularly limited herein and is typically determined based on available manufacturing space and existing infrastructure. It is preferable for the piercing station to be prior to the adhesive station since this reduces maintenance issues in the piercing station. In the embodiment illustrated in FIG. 6 the adhesive is not visible. The pierced protrusion layer passes through a second coating zone, 110, wherein a surface adhesive, 112, is applied. Rotation of the core, relative to the supply mechanism, continually draws the pierced protrusion layer, with adhesive on each side thereof, onto the core at a pitch determined by the relative rate of advancement of the core thereby forming a continuous improved paper tube, 130, with a pierced protrusion layer as the outer layer and a surface adhesive on the pierced protrusion layer. A cutting station, 116, cuts the continuous paper tube into segments, 120. Prior art paper tubes with a surface adhesive typically require some form of wrapping to insure adjacent tubes do not adhere to each other during storage and transport. This is not necessary and is preferably avoided in an embodiment of the invention.

The width of the pierced protrusion layer is not particularly limited herein and is typically set by the design of the equipment. The width is chosen for efficiency with the proviso that the rolls are not so large as to be difficult to handle. In practice the pierced protrusion layer is at least about 1 inch wide to no more than about 8 inches wide. Below about 1 inch the paper tends to tear and above about 8 inches the paper is more difficult to handle. Narrower or wider pierced protrusion layers could be used on equipment designed to accommodate the widths. More preferably the pierced protrusion layer is at least about 3 inches wide to no more than about 6 inches wide. For a large number of applications the pierced protrusion layer is at least about 4 inches wide to no more than about 6 inches wide.

The pitch and separation distance can be related and are selected based primarily on the adhesion requirements. It is often preferable for the core to provide the necessary strength. A large pitch is preferable for achieving a large separation distance. The pitch can be a positive pitch, which is defined as a pitch in the same direction as the surface layer of the core, or a negative pitch, which is defined as a pitch which is the opposite direction as the surface layer of the core. A positive pitch is preferably when a continuous manufacturing process is employed since the core can advance through the core manufacturing process and continue through application of the pierced protrusion layer. The pitch is preferably at least about 30°. Below about 30° the layer quality may be compromised. More preferably the pitch is at least about 45°. A pitch of at least about 85° is suitable for some applications with a pitch of about 90° being used in many applications. The separation distance is preferably at least −1 inch to no more than the width of the pierced protrusion layer. More preferably the separation distance is at least 0 inches to no more than about 2 inches. Even more preferably the pitch is no more than about ¾ inch.

The lateral separation and frequency separation define the total number of pierced protrusions on the surface and are selected based on the number necessary to insure adequate separation between adjacent paper tubes during shipping and handling. If the number is too small the flex of the paper tubes can be sufficient to allow the surface adhesives of adjacent paper tubes to fuse thereby defeating the purpose of the pierced protrusions. If the number is too large the surface area available for surface adhesive is insufficient and the paper is more susceptible to tearing. The lateral separation is preferably at least about 1/16 inches to no more than about 2 inches. More preferably the lateral separation is preferably no more than about 1 inch. The frequency separation is preferably at least about 1/16 inches to no more than about 2 inches. More preferably the frequency separation is no more than about 1 inch. The number of rows of pierced protrusions on a pierced protrusion layer is not particularly limited herein. It is preferable to have at least one row to no more than about 20 rows with about 5 to about 15 being preferable for a typical pierced protrusion layer having a width of about 4 to 5 inches.

The core is not particularly limiting herein provided the strength and weight are adequate for the intended use. Cellulose based materials, particularly lignocellulose materials, are most preferred due to the cost, availability and the wide spread use. Other materials such as natural and synthetic materials can be used to demonstrate the invention but are less preferable for large scale use due to cost considerations. The core typically comprises many layers of material formed as a convolute tube or as a spiral wound tube both of which are well known to those of skill in the art.

The cutting station is not particularly limited and any cutting station typically used in the manufacture of tubes can be used for demonstration of the invention.

The coating stations for application of the adhesive layer and surface adhesive are not particularly limited herein with any method typically utilized for applying adhesives to a web being suitable for demonstration of the invention.

The piercing station is not particularly limited herein.

Pressure sensitive adhesives require pressure to initiate bonding between the adhesive and the substrate, whereas other adhesives require heat, water or a solvent. Pressure sensitive adhesives are widely available from commercial sources and can be selected based on the desired properties.

Contact adhesives adheres to itself, taking along what ever it is attached to. Contact adhesives sensitive adhesives are widely available from commercial sources and can be selected based on the desired properties. It is preferred that the contact adhesive be a hardening glue to provide integrity to the pierced protrusions. Carauster W-022 is exemplary as a hardening glue suitable for demonstration of the invention.

The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. An improved paper tube comprising:
   a core;
   an adhesive on said core;
   a pierced protrusion layer comprising pierced protrusions wherein said pierced protrusion layer is wound on said core and adhered to said core by said adhesive wherein said adhesive at least partially fills said pierced protrusions; and
   a surface adhesive on said pierced protrusion layer wherein said surface adhesive is between said pierced protrusions and has a thickness which is less than a height of said pierced protrusions.

2. The improved paper tube of claim 1 wherein said adhesive fills a majority of said pierced protrusion.

3. The improved paper tube of claim 1 wherein said pierced protrusion layer is on said core at a pitch.

4. The improved paper tube of claim 1 wherein said surface adhesive is between adjacent rows of said pierced protrusions.

5. The improved paper tube of claim 4 wherein said surface adhesive covers said pierced protrusion layer.

6. The improved paper tube of claim 1 wherein said pierced protrusion layer has a separation between adjacent wraps.

7. The improved paper tube of claim 6 wherein said separation is selected from a negative separation and a positive separation.

8. The improved paper tube of claim 1 wherein said core is selected from a convolute tube and a spiral wound tube.

9. The improved paper tube of claim 1 wherein said surface adhesive is selected from a contact adhesive and a pressure sensitive adhesive.

10. A method for forming an improved paper tube comprising:
    providing a core;
    adhering a pierced protrusion layer to said core as a winding with an adhesive wherein said pierced protrusion layer comprises pierced protrusions and said adhesive at least partially fills said pierced protrusions; and
    applying a surface adhesive to said pierced protrusion layer between said pierced protrusions wherein said surface adhesive is has a thickness which is less than a height of said pierced protrusions.

11. The method for forming an improved paper tube of claim 10 further comprising:
    providing a precursor layer.

12. The method for forming an improved paper tube of claim 11 further comprising applying said adhesive to said precursor layer.

13. The method for forming an improved paper tube of claim 12 further comprising forming said pierced protrusions in said precursor layer prior to said applying of said adhesive.

14. The method for forming an improved paper tube of claim 10 wherein said adhesive fills a majority of said pierced protrusion.

15. The method for forming an improved paper tube of claim 10 wherein said pierced protrusion layer is wound with a pitch.

16. The method for forming an improved paper tube of claim 10 wherein said surface adhesive is applied between adjacent rows of said pierced protrusions.

17. The method for forming an improved paper tube of claim 16 wherein said surface adhesive covers said pierced protrusion layer.

18. The method for forming an improved paper tube of claim 10 wherein said pierced protrusion layer has a separation between adjacent wraps.

19. The method for forming an improved paper tube of claim 10 wherein said core is selected from a convolute tube and a spiral wound tube.

20. The method for forming an improved paper tube of claim 10 wherein said surface adhesive is selected from a contact adhesive and a pressure sensitive adhesive.

* * * * *